3,042,710
ETHENOID CARBONYL COMPOUNDS
Jack Dickstein, Elkins Park, and Rose-Marie Hoegerle, North Hills, Pa., assignors to The Borden Company, a corporation of New Jersey
No Drawing. Filed Oct. 3, 1960, Ser. No. 59,798
5 Claims. (Cl. 260—482)

This invention relates to methylene carbonyl compounds characterized by containing the group

The compounds are useful as chelating agents for iron, copper, titanium and other polyvalent metals.

The invention comprises the following compounds and the process of making them.

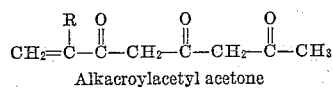

Alkacroylacetyl acetone

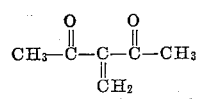

3-methyleneacetyl acetone

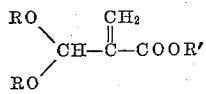

Alkyl 2-methylene-3-3'-dialkoxypropionate

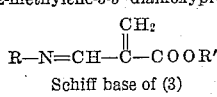

Schiff base of (3)

In these formulas, R and R' represent the same or different alkyls having therein 1–6 carbon atoms. Examples of R and R' are methyl, ethyl, and any propyl or butyl groups.

The compounds and the process of the invention are illustrated in the following examples. In these examples the dryings were made over anhydrous magnesium sulfate.

*Example 1.—Methacroylacetyl Acetone*

A suspension of sodium methoxide in 500 ml. benzene was prepared from 33 g. sodium and 150 ml. absolute methanol in usual manner.

700 ml. methyl methacrylate, precooled to 6° C., was added to this cooled suspension. After 15 minutes, 100 g. acetyl acetone were admixed. The reaction was as follows:

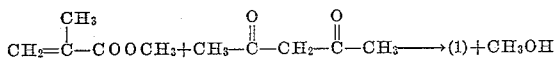

R in Formula 1 here is $CH_3$.

The reaction mixture was stored in the refrigerator for 2 days, during which a brownish red solution and a precipitate formed. After the addition of 700 ml. ice water, the upper organic layer so formed was washed. The resulting aqueous extracts were washed 4 times with 250 ml. methylene chloride. The combined methylene chloride extracts were dried, filtered and the solvent evaporated. The residue from the evaporation was distilled, to yield 5.7 g. of methacroylacetyl acetone of B.P. 70°–75° C. at 20 mm. of mercury pressure; $n_D^{23}$ 1.4327; and ultraviolet absorption spectrum in methanol:

Lambda$_{max.}$=272 mu E$_{max.}$=1.65×10$^3$ and infrared absorption spectrum: 1635, 1430, 945, 809 cm.$^{-1}$ showing

*Example 2.—3-Methyleneacetylacetone*

50 g. acetylacetone containing a few drops of piperidine was added dropwise to 40.2 g. of formalin (37% HCHO) over a period of 20 min. and the reaction mixture maintained at 60° C. After an additional 1.5 hrs. at 75°–80° C. the reaction product was cooled to room temperature, dissolved in 100 ml. methylene chloride, and washed with N hydrochloric acid and then with saturated ammonium sulfate solution. The methylene chloride solution was then dried, filtered and evaporated under vacuum. The residue was distilled. It gave 25.4 g. of distillate (46.5% of theory) of B.P. 135°–142° C. (2 mm.). A sample of this 3-methyleneacetylacetone redistilled for analysis showed B.P. 139°–140° (1.7 mm.) and $n_D^{27}$ 1.4825.

*Analysis.*—Percent calcd. for $C_6H_8O_2$: C, 64.2; H, 7.2. Found: C, 64.0; H, 7.3.

Ultraviolet absorption spectrum in methanol:

Lambda$_{max.}$=262 mu (characteristic for 1,3-diketones). Infrared absorption spectrum: 1725, 1700, 1684 cm.$^{-1}$, showing

and 1620, 1595, 1420 cm.$^{-1}$, showing

Molecular refraction: calc. 28.4; found 29.4.

The reaction here involved is as above except for the acetyl group in the acetone used, this group remaining in the finished product.

The formula is (2) above.

*Example 3.—Ethyl 2-Methylene-3,3'-Diethoxypropionate*

12.1 g. of sodium hydride suspension in mineral oil (51.8% NaH) was suspended in 400 ml. absolute benzene. The mixture was vigorously stirred and maintained at reflux temperature during the slow addition of 43 g. ethyl 3,3-diethoxypropionate in 50 ml. benzene. The addition took 6 hrs., during which time an orange-brown precipitate slowly formed.

After the resulting mixture had been cooled to 5° C., the sodium salt of ethyl 3,3-diethoxypropionate was mixed therein and reacted with 20 g. chloromethyl methyl ether, the reaction temperature being kept at 5°–10° by an ice bath. The initially formed precipitate slowly disappeared and a new colorless powder separated. The stirring was continued for an additional period of 16 hrs. The remaining unreacted sodium hydride was destroyed by the addition of 20 ml. methanol.

The benzene solution that remained was washed with 50 ml. saturated potassium bicarbonate solution and then by 50 ml. water, dried and filtered. Removal of the benzene and other volatiles, by evaporation and distillation of the residue, gave 27.5 g. of a distillable fraction with a boiling range from 56°–74° (2 mm.) and an undistillable dark resinous residue (18.3 g.). The distillate was ethyl 2-methylene-3,3'-diethoxypropionate, Ultraviolet absorption spectrum in methanol:

Lambda$_{max.}$=230 mu, E$_{max.}$=3.65×10$^3$

Infrared absorption spectrum: 1634, 985, 920 cm.$^{-1}$, showing

The formula is (3) above, R and R' representing ethyl groups.

Example 4.—Schiff's Base

A solution of 4 g. (approximately 0.02 mole) of ethyl 2-methylene-3,3'-diethoxypropionate (the final product of Example 3) in 10 ml. ether and 0.4 ml. N hydrochloric acid was vigorously shaken at room temperature for 10 minutes. Nearly all of the aqueous phase disappeared. The resulting ether solution was then washed with 5 ml. saturated potassium bicarbonate solution, dried, filtered and the ether and other volatiles evaporated under reduced pressure. The residue was allowed to stand for 16 hrs. with a methanolic solution of methyl amine, prepared to contain 1.4 g. (approximately 0.02 mole) of methylamine hydrochloride. The mixture was concentrated under reduced pressure, whereby two layers were separated. The organic liquid phase was taken up in ether, dried, as above, filtered and the solvent evaporated. There was obtained 2.8 g. of a slightly yellow oil with a strong basic reaction. However, it showed no tendency to polymerize at room temperature in bulk or between glass or steel plates.

The infrared spectrum showed, in addition to the bands attributed to the carbon-carbon double bond and referred to in Example 4, a band at 1635 cm.$^{-1}$ typifying by its shape the —C=N— structure.

The reaction of the methyl amine with the ethoxy component of the product of Example 3 is represented as follows:

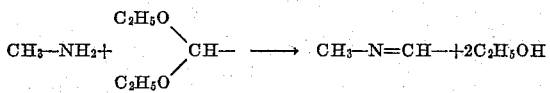

The complete formula for the Schiff base is (4) above, R and R' being $CH_3$ and $C_2H_5$, respectively.

In a modification of this example, the methyl amine is substituted by an equimolar proportion of any other primary alkyl amine having 2–6 and suitably 2–4 carbon atoms in the alkyl group.

In a further modification, the amine hydrochloride is replaced by any hydrohalide of the same amine, as by the hydrobromide or hydroiodide.

Example 5.—Use as Chelating Agents

The methylene compounds made as described herein and illustrated by the final products of Examples 1–4 are useful as chelating agents.

For such use they are maintained in contact for an hour or so with the polyvalent metal salts, as in the proportion of 100 parts of the methylene compound as the chelating agent for 2–10 parts dry weight of ferric chloride, cupric chloride, copper sulfate or the like in aqueous solution. The solution then either fails to respond to usual tests for the metal ions or shows reduced concentration of the ions.

Special advantages of our chelating agents include their ability to form stable complexes from aqueous solutions. The chelates, when polymerized, show enhanced heat stability.

It will be understood that it is intended to cover all changes and modifications of the examples of the invention herein chosen for the purpose of illustration which do not constitute departures from the spirit and scope of the invention.

We claim:

1. An ethenoid carbonyl compound selected from the group consisting of alkacroylacetyl acetone, 3-methyleneacetyl acetone, alkyl 2-methylene-3,3'-dialkoxypropionate, and substances of the formula

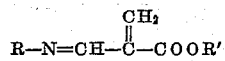

said alk and alkyl components, R and R' being alkyl groups having 1–6 carbon atoms.

2. Methacroylacetyl acetone.
3. 3-methyleneacetyl acetone.
4. Ethyl 2-methylene-3,3'-diethoxypropionate.
5. A compound of the formula

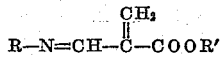

R and R' being alkyl groups having 1–6 carbon atoms.

No references cited.